United States Patent [19]
Maerki et al.

[11] Patent Number: 6,097,522
[45] Date of Patent: Aug. 1, 2000

[54] METHOD AND DEVICE FOR ALIGNING AN OPTICAL TRANSMISSION AND RECEPTION BEAM IN SATELLITE CONNECTIONS

[75] Inventors: Andreas Maerki, Erlenbach; Edgar Fischer, Muellheim Dorf, both of Switzerland

[73] Assignee: Oerlikon Contraves AG, Zurich, Switzerland

[21] Appl. No.: 08/974,903

[22] Filed: Nov. 20, 1997

[30] Foreign Application Priority Data

Dec. 6, 1996 [CH] Switzerland .......................... 2987/96

[51] Int. Cl.$^7$ .................................................. H04B 10/00
[52] U.S. Cl. ............................................ 359/159; 359/172
[58] Field of Search ..................................... 359/159, 172

[56] References Cited

U.S. PATENT DOCUMENTS

| | | | |
|---|---|---|---|
| 5,142,400 | 8/1992 | Solinsky ................................... | 359/159 |
| 5,475,520 | 12/1995 | Wissinger ................................ | 359/172 |
| 5,592,320 | 1/1997 | Wissinger ................................ | 359/159 |
| 5,710,652 | 1/1998 | Bloom et al. ........................... | 359/152 |

FOREIGN PATENT DOCUMENTS

2414/96 of 1996 Switzerland .

OTHER PUBLICATIONS

U.S. application No. 08/882,266, Oerlikon–Contraves, filed Jun. 25, 1997.
T.T. Nielson, "Pointing, Acquisition and Tracking System for the Free Space Laser Communication System, SILEX", *SPIE* vol., 2381 pp. 194–205.

G. Baister et al., "The SOUT Optical Intersattellite Communication Terminal", *IEE Proceedings Optoelectronics*, vol. 141, No. 6 (1994) pp. 345–355.

Shiratama et al., "Challenge for Optical Inter–Satellite Communications", *NEC Res. & Develop.*, vol. 37, No. 1, Jan., 1996 pp. 52–59.

Baister et al., "Pointing, Acquisition and Tracking for Optical Space Communications", *Electronics & Communication Engineering Journal*, vol., 6 Dec. 1994, pp. 271–280.

*Primary Examiner*—Leslie Pascal
*Assistant Examiner*—Hanh Phan
*Attorney, Agent, or Firm*—Townsend and Townsend and Crew LLP; Guy W. Chambers

[57] ABSTRACT

The method and the device of the present invention are used for aligning a transmitted and a received beam in satellite connections for the purpose of establishing and maintaining a connection between satellites by optical communications means. The device includes a control unit (3), to which a coarse adjustment unit (7), a fine adjustment unit (6), and a lead correction unit (8) are parallel connected. The parameters of the received beam (4) and also the angular values of the transmitted beam (15, 16) can be corrected by means of various summing members (5, 12, 14) in such a way that precise tracking of the received beam is achieved.

13 Claims, 4 Drawing Sheets

METHOD AND DEVICE FOR ALIGNING AN OPTICAL TRANSMISSION AND RECEPTION BEAM IN SATELLITE CONNECTIONS

FIELD OF THE INVENTION

The invention relates to a method for aligning an optical transmission and reception beam in satellite connections for the purpose of establishing and maintaining a connection between two satellite or partner terminals, each of which has at least one telescope for optical communication. The invention also relates to a device for executing the method.

BACKGROUND OF THE INVENTION

In comparison with microwave point-to-point radio relays, optical connections for data transmission between satellites in space have been shown to be very advantageous. Thanks to the extremely short wavelength of light, an optical beam can be radiated very easily by means of a relatively small optical device at a narrow space angle. By means of the antenna gain achieved in this way, a high data rate can be transmitted with low transmission output. Corresponding directional antennas for microwave connections are comparatively heavy and require a relatively large space. However, because an optical transmitted beam can be easily collimated, it requires an extremely exact determination and tracking of the direction of the transmitted beam as well as that of the reception direction.

It must be considered an additional difficulty that a satellite, being a body which moves dissociated in space, cannot bleed off mechanical vibrations via fixed connections or a surrounding atmosphere and therefore displays mechanical self-resonance which still occurs in the range of some kilohertz and can be detected because of the vibrations induced by the rocket engine, in particular following orbit changes or correcting maneuvers. These mechanical vibrations are transferred to an optical data transmission device on board the satellite and impair the correct alignment of the transmitted beam as well as the maintenance of the reception direction.

A further problem caused by the transmitted beam being radiated through only a narrow angular range is the establishment of an optical connection between two satellites, since both optical transmission devices must perform their extremely mutual alignment on their own. In tests and concepts for solving these problems made up to now, contact establishment was divided into three sections. First a mutual acquisition phase takes place, thereafter the respective reception direction and the respective transmitted beam are exactly aligned in respect to each other, and then the alignment is exactly tracked. Furthermore, the devices used for the individual steps are usually sectionalized.

In a first step, the optical transmitting and receiving devices are set by means of servo motors to a required value at a large angular range with comparatively little precision. Fine adjustment is usually provided by means of a small, low-mass piezo-electrically adjustable mirror, by means of which the effect of mechanical vibrations of the satellite body is also compensated. Finally, the direction of the transmitted beam must be oriented slightly differently than the reception direction, if both satellites move in respect to each other.

The light must be transmitted at a defined lead correction angle to the counter station in order to impact on the satellite. Therefore this lead correction angle is approximately determined from twice the running time of the light between the two satellites and from their relative velocity in respect to each other. To make mutual acquisition possible, a considerably more powerful transmitter is provided in a conventional optical transmission device, which radiates through a larger spatial angle than the transmitted beam provided for the actual communication and which is paralactically mounted in respect to the optical device of the actual communication system (T.T. Nielsen "Pointing, Acquisition and Tracking System for the Free Space Laser Communication System SILEX", SPIE, vol. 2381, "Free-Space Laser Communications Technologies VII", pp. 194 to 205, ISBN 0-8194–1728-9).

Based on already existing data regarding the position of the satellite intended as the counter station, the device on a satellite starts to illuminate a defined angular range by means of the considerably stronger optical transmitter identified as a beacon, while a corresponding angular range is scanned on board the other satellite as the reception direction. As soon as the beacon signal has been detected, the receiving direction is set exactly and, on the basis of its angular change, the lead correction angle for the transmitted beam is determined and the latter is transmitted to the other satellite. After its reception, the other satellite will set the reception direction exactly, will also return a transmitted beam with the matched lead correction angle and shut down the operation of the beacon. Finally, the exact tracking of the transmission and reception direction is performed, wherein the lead correction angle is separately readjusted on the basis of the angular velocity of the respective counter station.

The coarse setting of the transmission and reception direction takes place by rotating the telescope provided for this around two axes by means of reduction-geared stepper motors. Fine adjustment is performed by a mirror immediately behind the telescope. The former can be tilted around two axes, wherein the tilting movement takes place by coils located in permanent magnetic fields and connected with the mirror. The position of the mirror is detected by inductive sensors.

The received light beam aligned in this way is distributed to the sensors required for the individual stages of the connection establishment and for maintaining the connection. In the present exemplary embodiment these are two separate CCD sensors similar to those which can also be found in video cameras. The CCD sensor used for acquisition has a resolution of 288×288 pixels and therefore a relatively wide field of view. It is the job of this sensor to detect the pixel which in comparison is illuminated the strongest in order to monitor its placement into the range of the much narrower field of view of the CCD sensor provided for controlling the precise alignment and tracking. The CCD sensor provided for tracking only has 14×14 pixels in order to make possible its rapid read-out, since the data obtained by means of this sensor are also used for compensating the self-resonance of the satellite. Finally, the received beam is supposed to be distributed over many central pixels of the sensor, whose respective illumination is compared, because of which the resolution of the angle falls beneath the threshold generated by the size of the individual pixels. Some pixels adjoining these four pixels are also read out for estimating the dark current and correcting errors as a result thereof. Therefore the achievement of the stable final state requires several steps:

First, detection by the acquisition sensor, then the transfer into the field of view of the sensor intended for tracking the received beam, furthermore the alignment on the four central pixels within its detected range and finally the most exact possible alignment by means of the quantitative comparison of the photo flows delivered by them.

The disadvantages of the prior art outlined by means of this example are, for one, the considerable complexity of the entire devices required for acquisition, alignment and tracking of the transmitted beam and the received beam.

In addition, no optical communications signal has as yet been detected during the exact alignment of the transmitted beam and the received beam, a high-speed photodiode with a front end downstream thereof is required for this. CCD sensors in particular require complex electronics for their control, which require space and add weight, this all the more because under space conditions the complexity of electronic components results in an increased failure probability, just consider the damaging effects of gamma radiation, and therefore requires the availability of redundant components.

OBJECT AND SUMMARY OF THE INVENTION

It is therefore the object of the invention described below to avoid the disadvantages of the prior art and to achieve a rugged acquisition and tracking of an optical transmitted beam as well as the received beam on the simplest possible system technique level.

This object is attained in accordance with the invention by a method for linking a detection error signal with a control value in such a way that the linkage is performed with the aid of an additional summing arrangement whose output value acts on the lead correction device, and wherein the control value is lead correction value, in which said detection error signal acts as a fine adjustment angle via a fine alignment device on said second summing arrangement on which said lead correction angle or said coarse adjustment angle also acts as a control value, and wherein said fine adjustment angle simultaneously also acts on the first summing arrangement, an in which the alignment and maintenance of the connection is iteratively achieved by means of the values determined in this manner, and by a device in which the adjustment angles of the fine adjustment unit are conducted to a first summing arrangement and simultaneously to a second summing arrangement, in which the adjustment angles of the coarse adjustment unit are conducted to the first summing arrangement and to the second summing arrangement, in which the adjustment angle of the lead correction angle unit is additionally conducted to the second summing arrangement, and to a lead angle detection unit, in which an error angle of the first summing arrangement represents the corrected received signal, and in which the error angle is conducted to an error detection unit, from which a detection error signal is derived, which acts on the fine adjustment unit.

The system in accordance with the invention for the coarse alignment of the transmitted beam and the received beam consists of two mirrors arranged in the shape of a periscope. The periscope is rotatable in two axes in respect to the azimuth and elevation by means of electrical servo motors and permits to direct of the transmitted and received beam with a hemisphere. The motors are electrically commutated and act without reduction gearing on the elements to be rotated in respect to each other, furthermore, no lines to be conducted over the rotatable connection are required for the rotating motor.

One of the two mirrors can be tilted in addition in two axes which are located orthogonally in respect to each other and therefore permits the fine adjustment of the light beams as well as a compensation of mechanical vibrations of the satellite body.

The tilt axes of this mirror do no touch any mechanically fixed pivot and instead are the result of the superimposition of linear movements of the suspension points of the mirror. Uncoupling of the rotating movements around the two orthogonal axes is assured to a large extent because of the lack of a fixed mechanical pivot. Therefore a movement around the axis of rotation does not manifest itself by a slight deflection of the orthogonal axis of rotation.

Two additional mirrors, which can be tilted in two axes, allow the adjustment of the lead correction angle of the transmitted beam and a further fine adjustment of the received beam. The lead correction angle of the transmitted beam is detected and controlled by a separate sensor. If both the tiltable mirror provided for the fine adjustment of the received beam and that for controlling the lead correction angle are designed in such a way, that their dynamic behavior is sufficient for compensating shocks of the satellite body, none of the periscope mirrors needs to be rapidly tiltable.

The system has only an optical sensor (PSD sensor-positionally-sensitive detector) for determining the lead correction angle of the transmitted beam and a CCD sensor for the acquisition of the beam transmitted by the beacon of the counter station. For tracking, there is on the reception side a four quadrant circuit of high-speed photodiodes, which at the same time deliver the electrical reception signal, which can be well distinguished from extremely strong secondary light sources, such as the sun, by means of the simultaneous superimposition with the light of the local oscillator of the homodyne transmission system being used.

The device allows a fine adjustment of the received beam independently of the transmitted beam, if in the acquisition phase the transmitted beam is not to be affected by two terminals, wherein the actual field of view of the four quadrant circuit is traversed and a very precise alignment is made possible by means of a series-connected telescope.

Further advantages of the invention are the simultaneous employment of a set of highspeed photodiodes as directional sensors as well as for receiving the optical communications signal, as well as the possibility of changing the reception direction of highspeed photodiodes by narrow angles without affecting the transmitted beam.

An additional advantage is the possibility of correcting errors in the optical devices of the receiver without affecting the transmitted beam. Because of the lowest possible number of movable parts and of the dependability under space conditions provided thereby, the coarse alignment of the transmitted beam and the received beam by electronically commutated direct-drive motors has been shown to be advantageous. Furthermore, in the course of its movements a drive without the interposition of a mechanical gear does not cause any shocks and permits a more rapid setting of angular changes.

Further details, characteristics and advantages of the invention ensue not only from the claims and the characteristics to be found therein, either by themselves or in combination, but also from the following description of a preferred exemplary embodiment.

DETAILED DESCRIPTION OF THE PREFERRED EMBODIMENT

Figure 1:
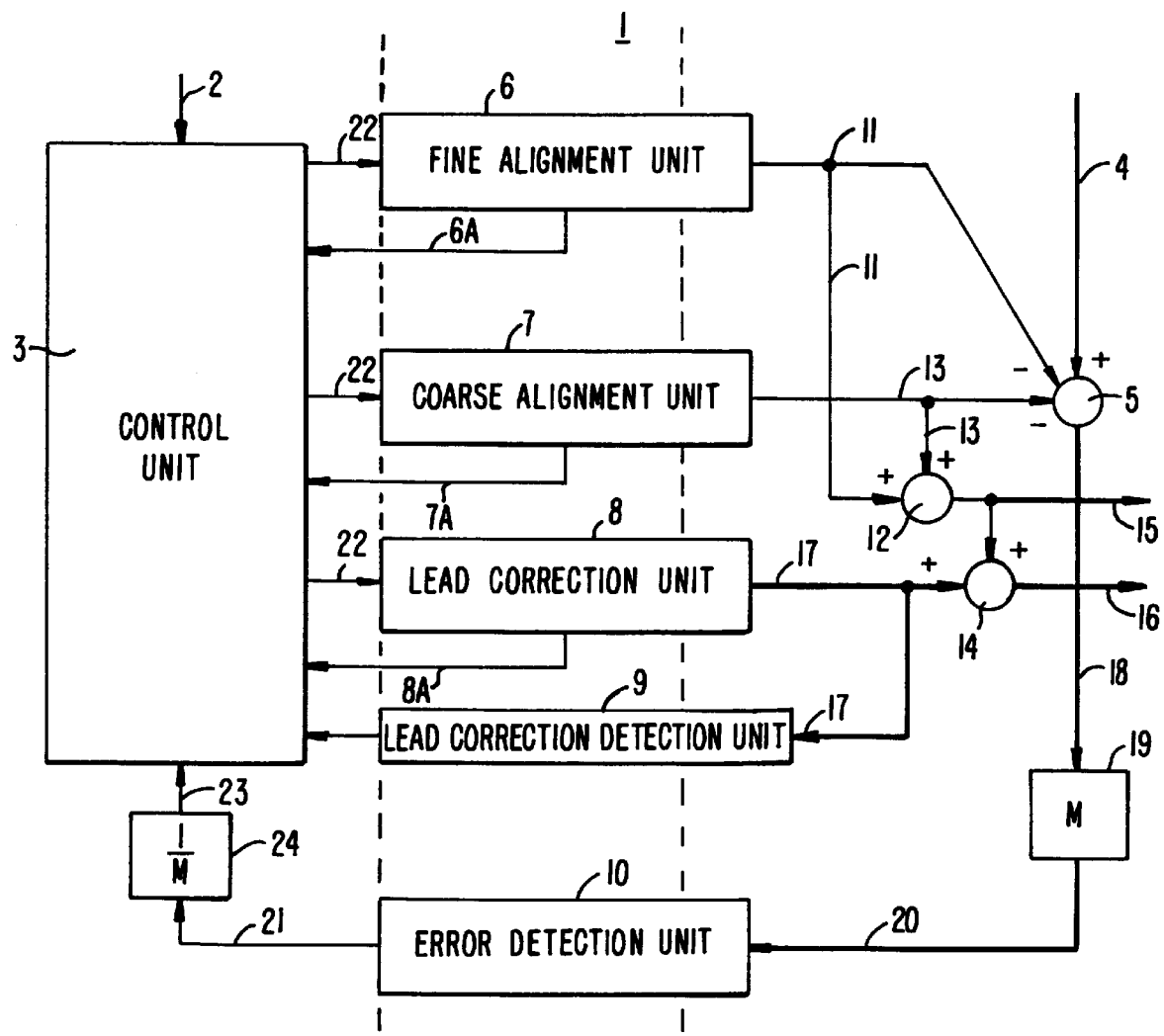
FIG. 1 represents a schematic functional structure of a regulating and control device of a partner satellite terminal.

The schematic functional structure of a regulating and control device 1 of a satellite terminal is represented in FIG. 1, wherein a control unit 3 receives, among other information, velocity and location information of the partner satellite via a first input line 2 and wherein a mirror acting as the first summing member 5 is provided with input values regarding azimuth and elevation of the received beam directly by the optical received beam 4. The regulating and control device 1 furthermore comprises a fine alignment unit 6, a coarse alignment unit 7 and a lead correction unit 8, respectively arranged parallel with each other, as well as a lead correction detection unit 9 and an error detection unit 10.

The fine alignment unit 6, the coarse alignment unit 7 and the lead correction unit 8 are connected with the control unit 3 via data lines 22. The fine adjustment unit 6 delivers a measured fine adjustment unit angle to the control unit 3 via an output line 6a. The coarse adjustment unit 7 delivers a measured coarse adjustment unit angle to the control unit 3 via an output line 7a. the lead correction unit 8 delivers a measured lead correction angle to the control unit 3 via an output line 8a.

Furthermore, the fine adjustment unit 6 generates a first adjustment angle 11 and the coarse adjustment unit 7 a second adjustment angle 13. These two adjustment angles, the first adjustment angle 11 and the second adjustment angle 13, act with respectively the same sign on the one hand on the first summing member 5, from which a first error angle 18 results, and on the other hand on a second summing member 12, whose output angle 15 represents the direction of the periscope and therefore corresponds to the outward radiation direction of the beacon. In a simplified embodiment it is also possible to select the direction of the beacon to be identical with the second adjustment angle 13.

The lead correction unit 8 for its part generates a lead correction angle 17 which, on the one hand, is fed to the lead correction detection unit 9, so that it can be measured, and on the other hand to a third summing member 14 which, as a further input, has the direction of the periscope, the output angle 15, and therefore generates the direction of a transmitted beams 16 as the output value. The direction of the transmitted beam 16 is controlled in such a way that it only differs from the direction of the received beam 4 by the slowly varying lead correction angle 17. The first error angle 18 is conducted to the telescope (not represented for the sake of clarity), where it is multiplied by the telescope amplification 19 and is fed to the error detection unit 10 as an internal angular error.

An output signal 21 of the error detection unit 10 is fed, corrected by the telescope reduction factor 24, via an input track 23 to the control unit 3. (For easier understanding, the optical tracks have been identified by selecting increased line thickness)

The control unit 3 is designed in such a way that it calculates and monitors the geometric axis transformations, calculates the lead correction angle, performs the respective updating with the space parameters and also calculates the regulations and makes the data determined in this way available via data lines 22 to the fine adjustment unit 6, the coarse adjustment unit 7 and the lead correction unit 8 as input data.

It is therefore possible to deflect a beam into a direction in space or to receive a beam from a direction in space by means of the coarse adjustment unit 7. In this case the direction range typically covers a hemisphere.

But for a precise reception on a vibrating platform, the mobility of the orientation of the coarse alignment unit 7 often has too narrow a bandwidth. For this reason an additional, rapidly reacting fine adjustment unit 6 is provided in accordance with the invention. So that this unit can be rapid, the mechanical part must be very small and light, and the angular range to be covered also must be narrow (typically<2°).

The angular values of the transmitted beam 16 are precisely controlled by means of the lead correction unit 8, so that it extends parallel with the incoming beam, except for the lead correction angle. In this case the beam adjustment can take place in such a way that the two partner terminals exchange information regarding the transmission output, on the one hand and, on the other hand the received beam output via communications sub-channel methods (see Swiss Patent Application 2414/96 in this connection), and then maximize this relationship.

Figure 2:
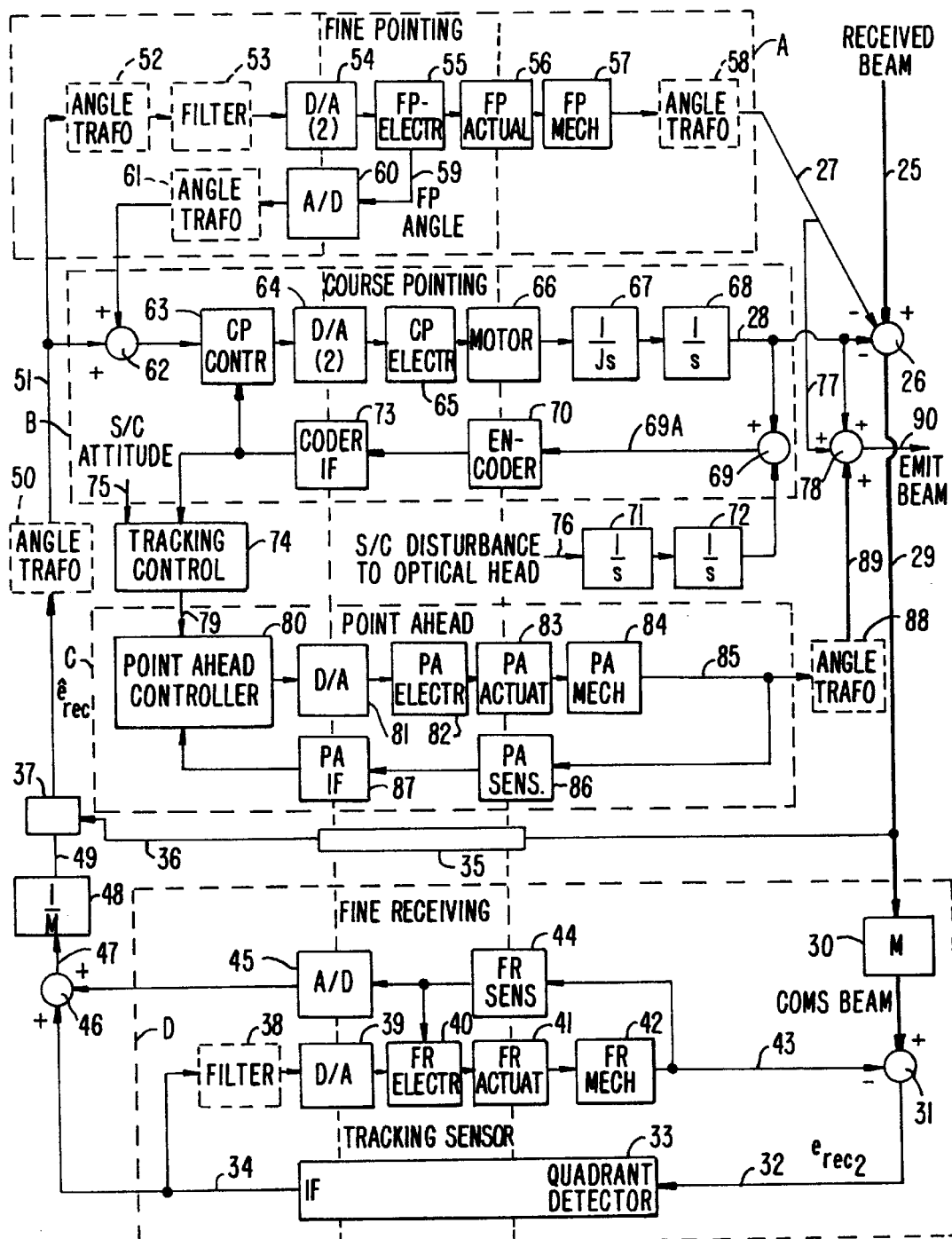
FIG. 2 represents the schematic structure of the whole device for the acquisition, mutual alignment and tracking of the transmitted beam and received beam with fine and coarse adjustment.

The schematic functional structure in FIG. 2 is roughly arranged in the following sub-blocks:

a functional structure A for the mutual fine adjustment of the transmitted beam and the received beam, a functional structure B for the mutual coarse adjustment of the transmitted beam and the received beam, a functional structure C for regulating the lead correction angle of the transmitted beam, a functional structure D for the separate fine adjustment of the received beam and for its detection in a four quadrant detector, as well as further blocks and values connecting these sub-structures.

The input value of the entire system is an angle of the received beam 25, given by azimuth and elevation, which, via a first addition/subtraction member 26, forms a first error signal 29 in cooperation with first adjustment angles 27 and second adjustment angles 28 applied as the output value of the functional structure A and B for the fine and coarse adjustment of the receiving direction to the first addition/subtraction member 26. This is used, after passage through a multiplication factor 30 of a value M, introduced by an interposed telescope (not represented for the sake of clarity), as the input value for a further addition/subtraction member 31, whose differential signal 32 is converted in a four quadrant detector 33 from an optical into an electrical error signal 34. For acquisition, the first error signal 29 is converted by a CCD sensor 35 into an electrical error signal 36 and sent to a change-over switch 37. The electrical error signal 34 is returned to the further addition/subtraction member 31 via an optional filter 38, a subsequent digital/analog converter 39, an electronic control device 40, an actuator 41 and a mechanical fine adjusting device 42 as the adjustment angles 43. The adjustment angles 43 are returned via sensors 44 to the electronic control device 40 and, after an analog/digital converter 45, are conducted to a further addition member 46, the same as the electrical error signal 34. The total error signal 47 obtained in this way is divided in a reducer 48 by the factor M introduced via the telescope and, after passage through the change-over switch 37, is passed on as error signal 49 to an angle transformation member 50, at whose output an angular error signal 51 is available, which is suitable as the input value of the functional structures A and B. This angle error signal 51 originated either in the functional structure D or, in case of an acquisition of the light beam from the beacon of the counter station, in a CCD sensor 35 covering a larger field of view. The functional structure A for the mutual fine adjustment of the transmitted beam and the received beam optionally contains a further angle transformation member 52. Following an optical filter 53, a digital/analog converter 54, an electronic control device 55, electromechanical actuators 56 and a mechanical adjustment device 57 as well as an inherent angle transformation member 58, the first adjustment angle 27 results as the input value for the addition/subtraction member 26. A value 59, proportional to the adjustment angle, flows via a digital/analog converter 60 as well as a required angle converter 61 together with the angular error signal 51 as the input value into an addition member 62, whose output value acts via a controller 63, a digital/analog converter 64 and an electronic control device 65 on an electric motor, whose rotational acceleration is transformed by integration members 67 and 68 into the adjustment angle 28, which also appears as an input value at the addition/subtraction member 26 and is entered into the error signal 29, additionally flows into a further addition/subtraction member 69 and is there added to the integrated acceleration disturbances of the integration members 71 and 72. An output signal 69A of the addition/subtraction member 69 i s detected by an opto-mechanical encoder 70 and returned to the controller 63 after conversion in an interface 73, and also passed on to at racking controller 74. In the process interferences flow via the addition/subtraction member 69 into the measurement of the adjustment angle 28, which appear as accelerations 76 of the optical system as a result of the self-resonance of the satellite and which are symbolically converted into movement by the integration members 71 and 72. With the aid of further information regarding the position and velocity of the satellites, the tracking controller 74 determines a lead correction angle 79 of the transmitted beam in respect to the received beam, whose realization takes place via a point-ahead controller 80, a digital/analog converter 81, an electronic control device 82, electro-mechanical actuators 83 as well as an associated mechanic device 84. A first actual lead correction angle 85 is detected by an optical sensor 86 and returned via an interface 87 to the point-ahead controller 80. The first lead correction angle 85 is transformed via an inherent angle transformation member 88 into a lead correction angle 89 which, together with the adjustment angles 27 and 28 in the addition member 78, result s in an angle of reflection 90 of the transmitted beam.

Figure 3:
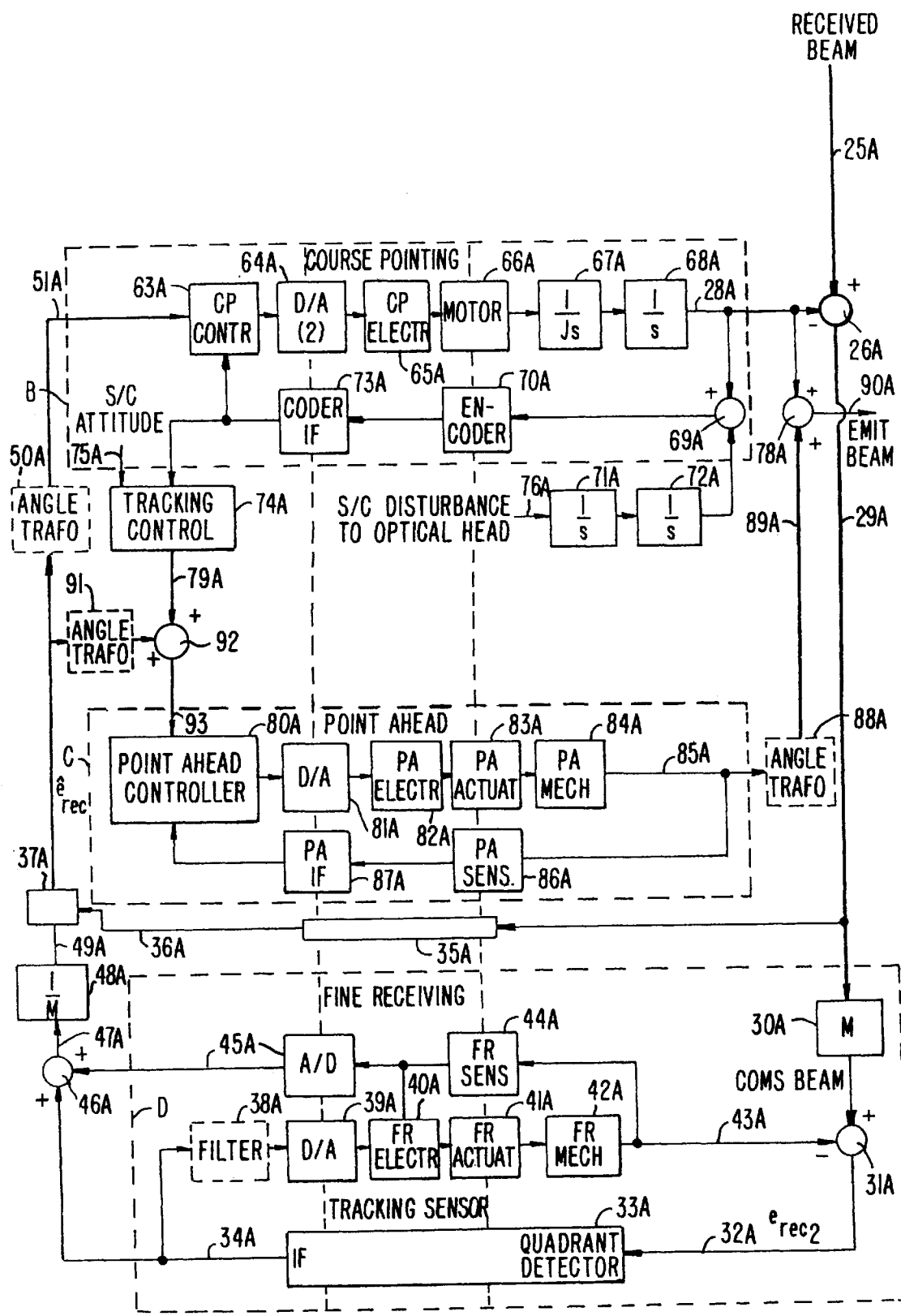
FIG. 3 represents the schematic structure of the whole device for the acquisition, mutual alignment and tracking of the transmitted beam and received beam without fine and coarse adjustment.

A simplified total structure of the system structure shown in FIG. 2 is represented in FIG. 3. The schematic functional structured here is reduced to the following subblocks:

a functional structure B for the mutual coarse adjustment of the transmitted beam and the received beam, a functional structure C for regulating the lead correction angle of the transmitted beam, a functional structure D for the separate fine adjustment of the transmitted beam as well for its detection in a four quadrant detector.

The improved chronological dynamics of decisive elements of the functional structure B make the take-over of the mutual fine adjustment by means of the mutual function block B possible, which in the total structure represented in FIG. 2 is assured by the functional structure by means of the structures A and B.

Again, the input value of the entire system is an angle of the received beam 25A, given by azimuth and elevation, which, via an addition/subtraction member 26A, forms an error signal 29A in cooperation with the adjustment angle 28A applied as the output value of the functional structure B for the coarse adjustment of the reception direction to the addition/subtraction member 26A. In contrast to the device represented in FIG. 2, only the adjustment angle 28A flows into the functional structure B used for coarse adjustment. An error signal 29A is used, after passage through a multiplication factor 30A of a value M, introduced by an interposed telescope (not represented for the sake of clarity), as the input value for a further addition/subtraction member 31A, whose differential signal 32A is converted in a four quadrant detector 33A from an optical into an electrical error signal 34A. For acquisition, the error signal 29A is converted by a CCD sensor 35A into a further electrical error signal 36A and sent to a change-over switch 37A. The electrical error signal 34A is returned via an optional filter 38A, an adjacent digital/analog converter 39A, an electronic control device 40A, an actuator 41A and a mechanical fine adjusting device 42A as the adjustment angles 43A to the further addition/subtraction member 31A. The adjustment angles 43A are returned via sensors 44A to the electronic control device 40A and, after an analog/digital converter 45A, are conducted to an addition member 46A, the same as the electrical error signal 34A. The total error signal 47A obtained in this way is divided in a reducer 48A by the factor M introduced via the telescope and, after passage through the change-over switch 37A, is passed on as error signal 49A to an angle transformation member 50A, at whose output an angular error signal 51A is available, which is suitable as the input value of the functional structure B. This angle error signal 51A originated either in the functional structure D or, in case of an acquisition of the light beam from the beacon of the counter station, in a CCD sensor 35A covering a larger field of view.

In contrast to the device represented in FIG. 2, the error signal 49A is additionally conducted via an angle transformation member 91 to an addition member 92, which contains a lead correction angle 79A of the transmitted beam as a further input value, and whose output value leads to a point-ahead controller 80A. The angular error signal 51A is used as the input value for a controller 63A, whose output value acts via a digital/analog converter 64A and an electronic control device 65A on an electric motor 66A, whose rotational acceleration is transformed by integration members 67A and 68A into the adjustment angle 28A, which appears as an input value at the addition/subtraction member 26A and is entered into the error signal 29A. The adjustment angle 28A is detected by an opto-mechanical encoder 70A and returned to the controller 63A after conversion in an interface 73A and also passed on to a tracking controller 74A. In the process, the measurement of the adjustment angle 28A flows in via the addition/subtraction member 69A as interferences on the one hand and, on the other hand, interference values originating from the accelerations 76A of the optical system as a result of the self-resonance of the satellite, which are symbolically converted into movements by the integration members 71A and 72A. With the aid of further information regarding the position and velocity of the satellite, which are entered via a further input 75A in the tracking controller 74A, the tracking controller 74A determines a lead correction angle 79A of the transmitted beam in respect to the received beam to which, in contrast to the structure described in FIG. 2, the error signal 49A converted by means of the optical transformation member 91 is added.

A set value 93 for an adjustment angle of the transmitted beam results in this way, whose realization takes place by means of a point-ahead controller 80A, a digital/analog converter 81A, an electronic control device 82, electromagnetic actuators 83A as well as an associated mechanical device 84A. An actual lead correction angle 85A is detected by an optical sensor 86A and returned via an interface 87A to the point-ahead controller 80A. The lead control angle 85A is optionally converted by means of a transformation member 88A into a lead correction angle 89A which, together with the adjustment angle 28A in the addition member 78A, results in an angle of reflection 90A of the transmitted beam.

Figure 4:
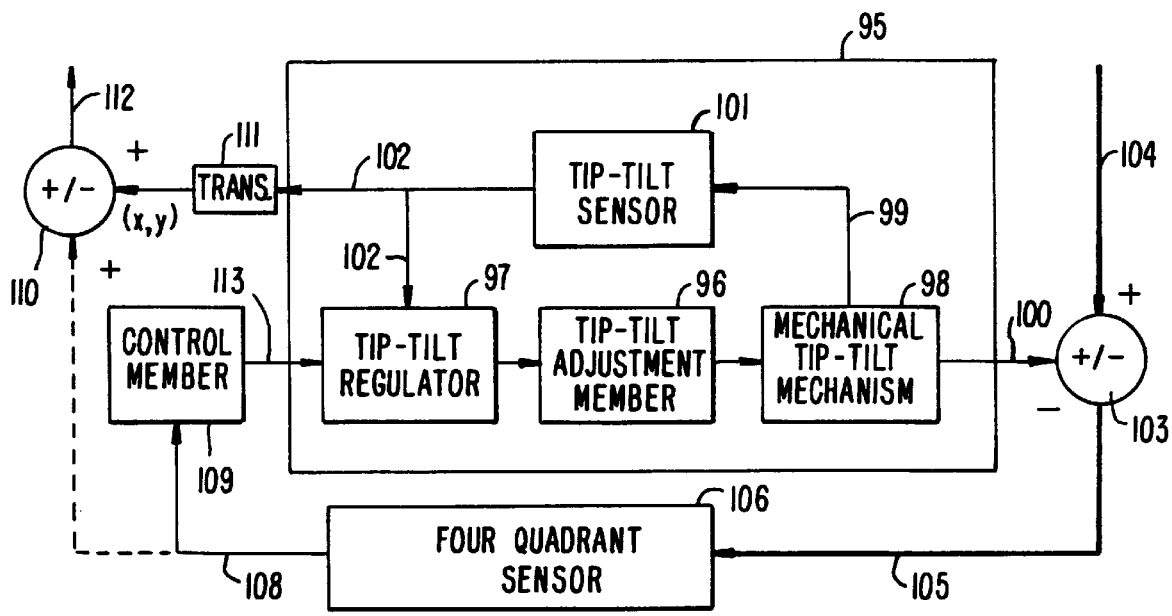
FIG. 4 is a detailed representation of the functional structure D of the fine-receiving unit.

How the fine servo station in accordance with the functional structure D of FIG. 2 and FIG. 3 operates for the separate fine alignment of the received beam and for its detection in a four quadrant detector is represented in detail in FIG. 4. The fine servo mechanism 95 in this case basically consists of a piezo-electrically operating tip-tilt adjustment member 96 which, controlled by a tip-tilt regulator 97, generates a triple mechanical displacement 99 and a double mechanical angular value 100 in a mechanical tip-tilt mechanism 98, wherein the mechanical displacement 99 is used as the input value of a tip-tilt sensor 101, which measures the mechanical displacement 99 and detects deviations 102, which are returned to the tip-tilt regulator. The mechanical angular value 100 is furthermore fed to an addition/subtraction member 103 and is there subtracted from the angular values of the received beam 104, which had already been corrected by coarse and fine adjustment. The signal 105 determined in this manner is analyzed by means of the four quadrant sensor 106, already represented in FIGS. 2 and 3, and the respective further deviations 108 are returned via a control member 109 to a further input 113 of the tip-tilt regulator 97. These further deviations 108 are in addition fed to a further addition/subtraction member 110, are linked there with the measurements of the mechanical displacement, the deviations 102, which were detected by means of the tip-tilt sensor 101, and are made available as the measured signal 112 to the control circuit. Prior to feeding the deviations 102 into the addition/subtraction member 110, the deviation correction values are conducted over a transformer 111 which is active in the x- and y-directions, which transforms the three mechanical displacements into two angles.

Figure 5:
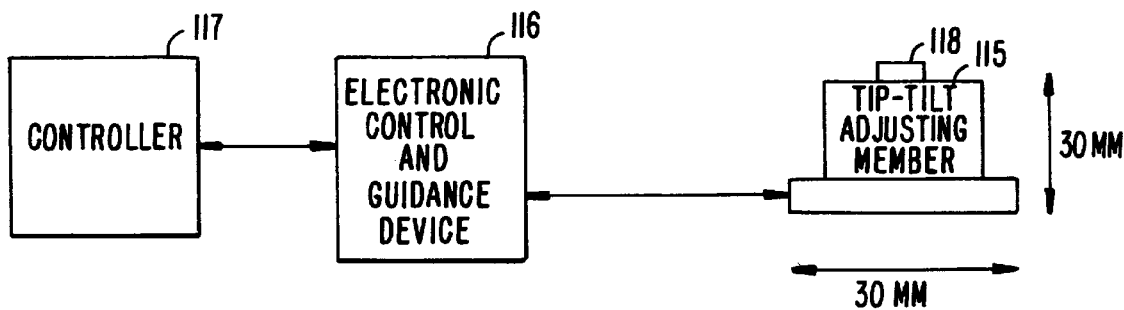
FIG. 5 represents a device for the fine alignment of the received beam.

A basic structure of the mechanical tip-tilt device with a tip-tilt adjusting member 115, which is controlled via an electronic control and guidance device 116 by a controller 117, is represented in FIG. 5. Such an adjusting member permits the tilting of a small and light mirror 118 over two axes and its movement in the direction of the normal vector of its surface. The movements of the mirror 118 can be performed exactly at a speed which is extraordinarily high for mechanical devices, so that it is also possible to compensate mechanical vibrations of a frequency of 1 kHz. Because of the very small size of the mirror 118 and of the cylindrically embodied tip-tilt adjusting member 115 (an approximate diameter of 30 mm and a height of 30 mm), as well as its weight-reduced construction, damaging effects on this highly precise system by the acceleration forces are avoided even in the starting phase of a satellite.

The summing members 12 and 14 in accordance with FIG. 1 actually constitute a summing arrangement, and the summing member 5 provided with a plurality of inputs can also be considered to be a summing arrangement. Correspondingly this can also apply in general to the summing members 26, 78, 26A and 78A in order to arrive at a common identification for all these elements. In this case the expression "summing arrangement" is used in an algebraic sense, since it can perform both addition and subtraction operations, as was mentioned above and which can also clearly be seen from the drawing figures.

The angle transformation members 50, 52, 61, 88, 50A, 88A, 91 are preferably used for the conversion by software of an error signal into respectively a single control signal for each mirror axis (elevation and azimuth). Some circuits have been represented only once in order to simplify the drawings.

In a further embodiment of the invention, the coarse adjustment angle and the received beam can act on a first summing member of the first summing arrangement, whose output beam is guided by means of a telescope before reaching a second summing member of the first summing arrangement on which the fine adjustment angle acts, wherein the fine adjustment angle and the transmitted beam can also act on a first summing member of the second summing arrangement, whose output beam is conducted by means of a telescope before reaching a second summing member of the second summing arrangement on which the coarse adjustment angle acts, in that preferably the telescope has either an enlargement factor M or a reduction factor 1/M, and which depends on to the direction of the beam, whether an enlargement factor or a reduction factor is provided.

What is claimed is:

1. A method for aligning an optical transmission and reception beam in satellite connections, each having angular values, for the purpose of establishing and maintaining a connection between two satellite or partner terminals, each of which has at least one telescope for optical communication, comprising the steps of subjecting the angular value of the transmitted and received beams to a coarse alignment in such a way that a coarse adjustment angle is generated by the coarse alignment and acts on a first summing arrangement, from which an error angle results, which represents the corrected received signal;

generating a lead correction angle from a lead correction unit;

having said coarse adjustment angle act on a second summing arrangement, so that the output value contains a correction of the transmitted beam;

detecting said error angle in an error detection device, from which a detection error signal is derived;

linking this detection error signal with a control value in such a way that this linkage is performed with the aid of an additional summing arrangement whose output value acts on the lead correction device, and wherein the control value is a lead correction value;

having said detection error signal act as a fine adjustment angle via a fine alignment device on said second summing arrangement on which said lead correction angle or said coarse adjustment angle also act as a control value, and wherein said fine adjustment angle simultaneously also acts on the first summing arrangement; and, iteratively achieving the alignment and maintenance of the connection by means of the values determined in this manner.

2. The method in accordance with claim 1, wherein:

said coarse alignment is provided for a range of approximately 180°; said fine alignment for a range of less than 5°;

said coarse alignment and said lead correction detection unit are realized by slow mechanisms, and said fine adjustment by a rapid mechanism;

except for the lead correction angle, said transmitted beam extends parallel with the received beam;

after a coarse and fine adjustment correction, an output signal of the angular values of the received beams is fed to an adjustment error detection, wherein an adjustment error detected in this way is provided to the coarse alignment, the fine alignment and the lead correction detection unit as an interference value.

3. The method in accordance with claim 2, wherein the alignment error is fed to a control unit, which in turn is connected with said coarse adjustment unit, fine adjustment unit and with a lead correction unit to perform and monitor geometric axis transformations, calculate the actual lead correction angle and coordinate the interference values.

4. The method in accordance with claim 1, wherein said transmitted and received beams transmit output information regarding the radiated output via an additional channel of an optical communications connection, and the beam alignment takes place by maximizing the received radiated output in reference to the transmitted output.

5. The method in accordance with claim 1, wherein in the starting phase of the alignment, the transmitted beam is replaced by a beacon beam, which is only corrected by the coarse and fine adjustment units.

6. A device for aligning optical transmission and reception beams in satellite connections, consisting of a fine adjustment unit; a coarse adjustment unit; a lead angle correction unit; wherein the adjustment angles of the fine adjustment unit are conducted to a first summing arrangement and simultaneously to a second summing arrangement;

the adjustment angles of the coarse adjustment unit are conducted to the first summing arrangement and to the second summing arrangement;

the adjustment angle of the lead correction angle unit is additionally conducted to the second summing arrangement, and to a lead angle detection unit;

an error angle of the first summing arrangement represents the corrected received signal; and the error angle is conducted to an error detection unit, from which a detection error signal is derived, which acts on the fine adjustment unit.

7. The device in accordance with claim 6, wherein the second summing arrangement has two summing members wherein the output value of the one summing member, which represents the angular values of a beacon signal, acts on the other summing member, whose output signal represents the angular values of said transmitted beam.

8. The device in accordance with claim 6 wherein an error signal of the first summing arrangement, which represents the corrected received signal reaches, via the error detection unit, an additional summing arrangement on which the output value of a tracking controller also acts, and whose output value acts on the lead correction unit.

9. The device for executing the method in accordance with claim 6, wherein, an error signal of the first summing arrangement, which represents the corrected received signal, reaches an additional summing arrangement via an error detection unit, on which the output value of a tracking controller also acts, and its output value acts on the lead correction unit.

10. The device in accordance with claim 6, wherein the output signal of the first summing arrangement is conducted to a control unit via a telescope having an enlargement factor, an error detection unit and a reducer, wherein the error detection unit has a four quadrant detector, and wherein the telescope has an enlargement factor M and the reducer a reduction factor 1/M, which depends on the direction of the beam, whether there is an enlargement or a reduction.

11. The device in accordance with claim 10, wherein the control unit has transformation means for a geometric axis transformation and for calculating the actual lead correction angle and the actual orbit parameters, makes these values available as the input data via connection lines to respectively the fine adjustment unit, the coarse adjustment unit or the lead correction angle unit, and that such a transformation means is inserted between the lead correction angle unit and the second summing arrangement.

12. The device in accordance with claim 6, wherein the error detection unit has a fine servo unit which includes at least one piezo-electrically acting drive in the form of a tip-tilt device, which is suitable for moving very small mirrors extremely fast and precisely for minimizing still remaining deviations from the received beam, so that vibrations of a frequency of less than 1 Khz are compensated, wherein the detection of the difference signal takes place by means of a four quadrant sensor, and wherein the small mirrors are embodied in a weight-saving manner.

13. The device in accordance with claim 6, wherein an output signal of the error detection unit is conducted to a control unit which contains a change-over switch.

* * * * *